(12) United States Patent
Morel et al.

(10) Patent No.: US 12,149,188 B2
(45) Date of Patent: Nov. 19, 2024

(54) DEVICE FOR RECOVERING OR DAMPING THE VIBRATORY ENERGY OF A RESONANT MECHANICAL ELEMENT

(71) Applicants: COMMISSARIAT A L'ENERGIE ATOMIQUE ET AUX ENERGIES ALTERNATIVES, Paris (FR); UNIVERSITE SAVOIE MONT BLANC, Chambery (FR)

(72) Inventors: Adrien Morel, Grenoble (FR); Adrien Badel, Lescheraines (FR); Franck Badets, Grenoble (FR); Nicolas Goux, Grenoble (FR); Gaël Pillonnet, Grenoble (FR)

(73) Assignees: COMMISSARIAT A L'ENERGIE ATOMIQUE ET AUX ENERGIES ALTERNATIVES, Paris (FR); UNIVERSITE SAVOIE MONT BLANC, Chambery (FR)

( * ) Notice: Subject to any disclaimer, the term of this patent is extended or adjusted under 35 U.S.C. 154(b) by 763 days.

(21) Appl. No.: 17/304,393

(22) Filed: Jun. 21, 2021

(65) Prior Publication Data
US 2021/0399657 A1 Dec. 23, 2021

(30) Foreign Application Priority Data
Jun. 22, 2020 (FR) ...................................... 20 06491

(51) Int. Cl.
*H02N 2/18* (2006.01)
*H02M 7/219* (2006.01)

(52) U.S. Cl.
CPC ............ *H02N 2/181* (2013.01); *H02M 7/219* (2013.01); *H02N 2/188* (2013.01)

(58) Field of Classification Search
CPC .......... H02N 2/18; H02N 2/181; H02N 2/183; H02N 2/185; H02N 2/186; H02N 2/188;
(Continued)

(56) References Cited

U.S. PATENT DOCUMENTS 7,081,693 B2 * 7/2006 Hamel ................ B60C 23/0411
307/151
8,773,004 B2 7/2014 Despesse et al.
(Continued)

FOREIGN PATENT DOCUMENTS

EP 3 306 802 A1 4/2018
FR 3 069 395 A1 1/2019

OTHER PUBLICATIONS

French Preliminary Search Report issued Mar. 26, 2021 in French Application 20 06491 filed Jun. 22, 2020, 2 pages (with English Translation of Categories of Cited Documents).
(Continued)

*Primary Examiner* — Derek J Rosenau
(74) *Attorney, Agent, or Firm* — Oblon, McClelland, Maier & Neustadt, L.L.P.

(57) ABSTRACT

A device for recovering or dampening vibratory energy from a mechanical resonator, comprising:
an electrical generator comprising an element for converting mechanical vibration energy into electrical charges coupled to the resonator, the electrical generator periodically transferring a portion of the electrical charges from one terminal of the conversion element to the other;
a frequency variation to phase variation conversion device, comprising an injection-locked oscillator of which the free-running oscillation frequency is equal to the resonance frequency of the resonator, and supplying to the electrical generator a control signal of frequency equal to that of the signal outputted by the conversion
(Continued)

element and of which the phase shift depends on the difference between the frequency of the signal outputted by the conversion element and the resonance frequency of the resonator.

19 Claims, 5 Drawing Sheets

(58) Field of Classification Search
CPC .... H10N 30/30; H10N 30/302; H10N 30/304; H10N 30/306; H10N 30/308
USPC .......................................................... 310/339
See application file for complete search history.

(56) References Cited

U.S. PATENT DOCUMENTS

2016/0315563 A1* 10/2016 Horiguchi .............. H02N 2/181
2019/0028041 A1    1/2019 Badel et al.

OTHER PUBLICATIONS

Goux et al., "A 500 pW 16 KHz Injection Locked Oscillator for Ultra-Low Power Time-Domain ADC Application", 2018 16th IEEE International New Circuits and Systems Conference (NewCas), IEEE, Jun. 24, 2018, pp. 200-204.
Lefeuvre et al., "Power and frequency bandwidth improvement of piezoelectric energy harvesting devices using phase-shifted synchronous electric charge extraction interface circuit", Journal of Intelligent Material Systems and Structures, 2017, 8 pages.
Lefeuvre et al., "A comparison between several vibration-powered piezoelectric generators for standalone systems", Sensors and Actuators A, Physical, 126, 2006, pp. 405-416.
Cai et al., "A piezoelectric Energy-Harvesting Interface Circuit with Fully Autonomous Conjugate Impedance Matching, 156% Extended Bandwidth, and 0.38 µW Power Consumption", IEEE International Solid-State Circuits Conference (ISSCC), 2018, 3 pages.
Nielsen-Lönn et al., "Design of Efficient CMOS Rectifiers for Integrated Piezo-MEMS Energy-Harvesting Power Management Systems", 2015 European Conference on Circuit Theory and Design (ECCTD), 2015, 5 pages.
Du et al., "A Fully Integrated Split-Electrode SSHC Rectifier for Piezoelectric Energy Harvesting", IEEE Journal of Solid-State Circuits, vol. 54, No. 6, Jun. 2019, pp. 1733-1743.
Liu et al., "An Efficient Interface Circuit for Miniature Piezoelectric Energy Harvesting with P-SSHC", Journal of Circuits, Systems, and Computers, vol. 29, No. 8, 2019, 18 pages.
Morel et al., "A Shock-Optimized SECE Integrated Circuit", IEEE Journal of Solid-State Circuits, vol. 53, No. 12, Dec. 2018, pp. 3420-3433.
Morel et al., "Self-Tunable Phase-Shifted SECE Piezoelectric Energy-Harvesting IC with a 30nW MPPT Achieving 446% Energy-Bandwidth Improvement and 94% Efficiency", 2020 IEEE International Solid-State Circuits Conference (ISSCC), 2020, 3 pages.
U.S. Appl. No. 17/120,682, filed Sep. 16, 2020, 2021/0083601 A1, Gibus, D, et al.
U.S. Appl. No. 17/120,682, filed Dec. 14, 2020, 2021/0184673 A1, Le Guevel, L, et al.

* cited by examiner

DEVICE FOR RECOVERING OR DAMPING THE VIBRATORY ENERGY OF A RESONANT MECHANICAL ELEMENT

TECHNICAL FIELD

The invention relates to the field of recovery or damping of the mechanical vibratory energy of a resonant mechanical element, or mechanical resonator. The invention can be applied in particular to the following fields:
  medical, such as for pacemakers;
  industrial maintenance, for example for the vibrations of production machines;
  sports, for example for the vibrations of shoe soles;
  automobile and aeronautical, for example for engine vibrations, fuselage vibrations, etc.
  real estate, for example for vibrations of structures such as bridges, buildings, etc.

STATE OF THE PRIOR ART

It is known to use a piezoelectric material to recover mechanical energy and convert it into storable electrical energy, for example, in a capacitor or battery. For this purpose, the piezoelectric material is, for example, placed at locations where significant mechanical deformations may occur: shoe soles, shoulder straps of a backpack, etc.

In many applications, mechanical energy is in the form of a harmonic displacement of a structure (vibrations of an engine, an aircraft fuselage, a machine tool, etc.). To recover the mechanical energy associated with the vibration of structures, it has been proposed to use resonant mechanical elements, or mechanical resonators, for example in the form of beams, oscillating with a maximum amplitude when the frequency of the vibrations corresponds to the resonance frequency of the resonators on which the piezoelectric material is deposited. The piezoelectric material deposited on such a resonator is deformed proportionally (to a first approximation) to the displacement of the resonator which then forms a piezoelectric generator.

This type of piezoelectric generator is very efficient when the frequency of the vibrations corresponds to the resonance frequency of the generator. However, as soon as the frequency of the vibrations deviates a little from the resonance frequency of the generator, the amplitude of the displacement decreases considerably, which reduces the amount of energy recovered.

This difference between the resonance frequency of the generator and the vibration frequency can have many origins in the real environment:
  inaccurate design of the piezoelectric generator;
  variation of the ambient vibration frequencies;
  aging of the generator, leading to a change in its stiffness for example:
  variation of the operating conditions (temperature, vibration amplitude) that can modify its resonance frequency due to mechanical non-linearities and piezoelectric coupling.

To solve this problem, several methods have been proposed to increase the bandwidth of generators and to dynamically adjust their resonant frequency. These methods can be mechanical, magnetic, or electrical.

In U.S. Pat. No. 8,773,004 B2, it is proposed to electrically adjust the resonant frequency of a piezoelectric generator using the indirect piezoelectric effect. Indeed, the voltage applied to the terminals of the piezoelectric material induces a mechanical force on the resonator. The amplitude and phase of the piezoelectric voltage (and thus of the induced force) have an influence on the dynamics of the generator. It is therefore proposed in this document to dynamically adjust the shape of the voltage applied to the terminals of the piezoelectric material to regulate the resonance frequency of the system, and thus maximize the recovered power even when the vibration frequency deviates from the "natural" resonance frequency (not modified by the voltage applied across the piezoelectric material) of the mechanical resonator. The solution proposed in U.S. Pat. No. 8,773,004 B2 requires a bank of discrete capacitors to adjust the resonance frequency and an accelerometer on the piezoelectric generator for the control algorithm. These two devices strongly limit the integration of the system. In addition, the placement of the accelerometer on the vibrating structure can be quite restrictive.

The paper by E. Lefeuvre et al, "A comparison between several vibration-powered piezoelectric generators for standalone systems" Sensors and Actuators A: physical, 126405-16, 2006 proposes a non-linear technique to maximize the energy recovered at resonance. This technique, called SSHI ("Synchronous Switch Harvesting on Inductance"), consists in leaving the piezoelectric material in open circuit most of the time, and inverting the charges in the piezoelectric material when the voltage at its terminals reaches an extremum. This reversal of charges is done through a storage capacitor Cr, a part of them remain in the capacitor and thus allow to collect energy while maximizing its extraction. During charge reversal, the piezoelectric material is connected to an inductor. The intrinsic capacitance of the piezoelectric material then forms an L-C loop with the inductor, and the charges (and energy) are quickly transferred from the piezoelectric material to the inductor, and then from the inductor to the piezoelectric material, via the capacitor Cr (which is much larger than the intrinsic capacitance of the piezoelectric material, of the order of 100 times larger).

This extraction technique can be used in autonomous systems made of discrete components, or self-powered ASICs. Although this technique is very efficient when the vibration frequency matches the resonance frequency of the piezoelectric generator, little energy is recovered when the piezoelectric generator is excited at frequencies different from its resonance frequency. Thus, the slightest shift between the resonance frequency of the piezoelectric generator and the vibration frequency leads to drastic losses in performance.

To address this problem, the paper by E. Lefeuvre et al, "Power and frequency bandwidth improvement of piezoelectric energy harvesting devices using phase-shifted synchronous electric charge extraction interface circuit," Journal of Intelligent Material Systems and Structures, 2017, and that of Y. Cai et al, "A piezoelectric energy-harvesting interface circuit with fully autonomous conjugate impedance matching, 156% extended bandwidth, and 0.38 uW power consumption," IEEE International Solid-State Circuit Conference (ISSCC) 2018, propose to recover energy synchronously with the resonator oscillation, not on voltage maxima, but with a phase shift $\emptyset \in [-90, 90]$. By recovering the energy with a certain phase shift from the resonator oscillations, it is possible to electrically change the resonant frequency of the piezoelectric generator by indirect piezoelectric effect.

Figure 1:
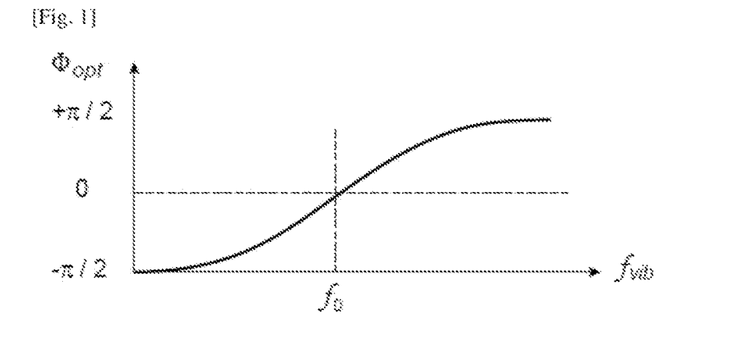
FIG. 1 shows the optimal value of the phase of the energy recovery times as a function of the value of the vibration frequency in a vibration energy recovery system.

The curve shown in FIG. 1 represents the optimal value of the phase $\phi_{opt}$ of the energy recovery instants as a function of the value of the vibration frequency $f_{vib}$, around the resonant frequency $f_0$ of the piezoelectric generator. The slope of this curve strongly depends on the electromechanical characteristics of the piezoelectric generator, and more particularly on the electromechanical coupling of the generator (depending on the piezoelectric material used and the geometry of the mechanical resonator) and on the mechanical quality factor of the resonator on which the piezoelectric material is deposited. The greater this coupling, the smaller the slope of this curve.

The paper by Y. Cai et al. previously mentioned proposes a semi-automatic control of the phase value of the energy recovery instants with respect to the resonator oscillations, based on a mapping table where five phase values are predefined according to the excitation frequency given by the frequency/voltage converter.

However, none of the previously described solutions allows for automatic and fast control and adjustment of the value of the phase shift between the energy recovery instants and the resonator oscillations of the piezoelectric generator.

DESCRIPTION OF THE INVENTION

There is a need to provide a vibration energy recovery device that achieves automatic control and adjustment of the phase shift between energy recovery instants and piezoelectric generator oscillations as a function of excitation frequency.

To this end, a device for recovering or damping vibratory energy of a mechanical resonator is proposed, comprising at least:
  an electrical generator comprising at least one element for converting mechanical vibration energy of the mechanical resonator into electrical charges mechanically coupled to the mechanical resonator and configured to output a conversion signal, corresponding either to a sinusoidal voltage obtained between first and second output electrodes of the conversion element or to a sinusoidal current obtained on the first output electrode of the conversion element, of a frequency equal to the vibration frequency of the mechanical resonator, the electrical generator being configured to periodically transfer, on command of a signal to be received on a control input, at least a part of the electrical charges from one to the other of the first and second output electrodes of the conversion element;
  a converter comprising an input electrically coupled to the first output electrode of the conversion element and configured to provide at an output a square wave signal of frequency equal to the frequency of the conversion signal;
  a device for converting frequency variation into phase variation, comprising at least a first injection-locked oscillator, with an injection input which is electrically coupled to the output of the converter and configured such that its free oscillation frequency is substantially equal to the resonance frequency of the mechanical resonator, and configured to output, on an output electrically coupled to the control input of the electrical generator, a periodic control signal with a frequency equal to the frequency of the conversion signal and including a phase shift, which, with respect to the conversion signal, is a function of the difference between the frequency of the conversion signal and the resonance frequency of the mechanical resonator.

This device proposes a solution for controlling and compensating the difference between the resonance frequency of the mechanical resonator and the vibration frequency to which the mechanical resonator is subjected, based on the use of at least one injection locked oscillator (ILO).

More particularly, this device forms a system allowing the self-adjustment of the phase shift between the voltage or the current generated by the electrical generator and the instant of inversion of the charges occurring within the generator, as a function of the mechanical excitation frequency, with a very low consumption and an almost instantaneous adjustment. This adjustment allows, thanks to the indirect piezoelectric or electromagnetic effect, to adjust the resonance frequency of the generator, and to slave it to the vibration frequency in order to maximize the power transfer.

The converter may be configured such that the outputted square wave signal has a first value when the derivative of the conversion signal is positive and has a second value, different from the first value, when the derivative of the conversion signal is negative. In this case, the converter outputs a signal, the value of which is representative of the sign of the derivative of the conversion signal.

The device for converting frequency variation into phase variation may also comprise:
  a second injection-locked oscillator, an injection input of which being coupled to the output of the first injection-locked oscillator and configured such that its free oscillation frequency is substantially equal to the resonance frequency of the mechanical resonator;
  a 180° phase shifter circuit, one input of which is coupled to the output of the second injection-locked oscillator.

In such a conversion device, the two ILOs are connected in quadrature. This device allows the output of a signal, the phase shift of which, with respect to the signal provided by the conversion element, is only due to the frequency difference with the resonance frequency of the mechanical resonator, because the phase shifter circuit allows the 180° phase shift provided by the two ILO to be canceled.

The device for converting frequency variation into phase variation may also include an EXCLUSIVE OR gate, a first input of which is electrically coupled to the output of the 180° phase shifter circuit, a second input of which is electrically coupled to the output of the 180° phase shifter circuit by means of a delay element, and outputting the periodic control signal.

The output of the EXCLUSIVE OR gate may be coupled to the control input of the electrical generator via an amplifier.

In a first embodiment, the electrical generator may further comprise:
  an electrical energy storage element including a first electrode electrically coupled to the first output electrode of the conversion element;
  an AC-to-DC voltage conversion device comprising a first input terminal electrically coupled to the first output electrode of the conversion element and a second input terminal electrically coupled to a second electrode of the electrical energy storage element; and
  a bi-directional switch configured to couple or not couple the second electrode of the electrical energy storage element to the second output electrode of the conversion element depending on the value of the signal received on the control input of the electrical generator.

According to a variant of the first embodiment, the electrical generator may comprise:
  an electrical energy storage element including a first electrode electrically coupled to the first output electrode of the conversion element;
  an AC-to-DC voltage conversion device; and a bi-directional switch configured to couple or not couple a second electrode of the electrical energy storage element to a first input terminal of the AC-DC voltage conversion device, and to couple or not couple the second output electrode of the conversion element to a second input terminal of the AC-DC voltage conversion device, depending on the value of the signal received at the control input of the electrical generator.

The electrical energy storage element may comprise at least one inductor or at least one capacitor.

According to another embodiment, the electrical generator may comprise:
- an AC-to-DC voltage conversion device;
- first and second switches configured to alternately couple the first output electrode of the conversion element to the second output electrode of the conversion element or to a first input terminal of the AC-to-DC voltage conversion device through a resonant capacitance;
- and wherein a second input terminal of the AC-DC voltage conversion device is electrically coupled to a second output electrode of the conversion element.

The AC-to-DC voltage conversion device may comprise a diode bridge. Alternatively, the AC-to-DC voltage conversion device may comprise an active rectifier.

The electrical generator may further comprise an output capacitor electrically coupled to the output terminals of the AC-to-DC voltage conversion device.

According to another embodiment, the electrical generator may comprise:
- an AC-to-DC voltage conversion device comprising first and second input terminals coupled to first and second output electrodes of the conversion element, respectively;
- a Buck converter comprising first and second input terminals coupled to first and second output terminals of the AC-DC voltage conversion device, respectively.

In this case, the device for converting frequency variation into phase variation may further comprise:
- a second injection-locked oscillator, the injection input of which is coupled to the output of the first injection-locked oscillator and configured such that its free oscillation frequency is substantially equal to the resonance frequency of the mechanical resonator;
- a 180° phase shifter circuit, one input of which is coupled to the output of the second injection-locked oscillator;
- a D flip-flop comprising a clock input coupled to the output of the 180° phase shifter circuit, a data input to which a non-zero electric potential is applied, a reset input, and an output coupled to a control input of a Buck converter switch;
- a voltage comparator having two input terminals to which a voltage outputted by the first and second output terminals of the AC-DC voltage conversion device is applied, and an output coupled to the reset input of the D flip-flop.

The conversion element may comprise at least one portion of piezoelectric material or at least one coil coupled to a magnetic element.

BRIEF DESCRIPTION OF THE DRAWINGS

The present invention will be better understood upon reading the description of the example embodiments given by way of illustration and not in any way limiting with reference to the appended drawings in which.

Identical, similar or equivalent parts of the various figures described below bear the same numerical references so as to facilitate the passage from one figure to another.

The various parts shown in the figures are not necessarily according to a uniform scale, to make the figures more readable.

The various possibilities (variants and embodiments) should be understood as not being exclusive of each other and may be combined with each other.

DETAILED DESCRIPTION OF PARTICULAR EMBODIMENTS

A device 100 for recovering vibratory energy from a mechanical resonator 102 according to a first embodiment is described below in connection with FIG. 2.

The device 100 comprises an electrical generator 104 including a conversion element 106 for converting mechanical vibratory energy of the mechanical resonator 102 into electrical charges. The conversion element 106 is mechanically coupled to the mechanical resonator 102 and is configured to output a conversion signal with a frequency equal to the vibration frequency $f_{VIB}$ of the mechanical resonator 102 (generally between 30 Hz and 300 Hz). In the first embodiment described herein, the conversion signal corresponds to a sinusoidal voltage obtained between first and second output electrodes 108, 110 of the conversion element 106. In FIG. 2, this sinusoidal voltage is referred to as $v_P$. Furthermore, in the example embodiment shown in FIG. 2, the second output electrode 110 of the conversion element 106 is connected to a reference electrical potential which here corresponds to ground.

Advantageously, the conversion element 106 comprises at least a portion of piezoelectric material. In FIG. 2, the mechanical resonator 102 and the conversion element 106 are shown together as a single element.

Figure 3:
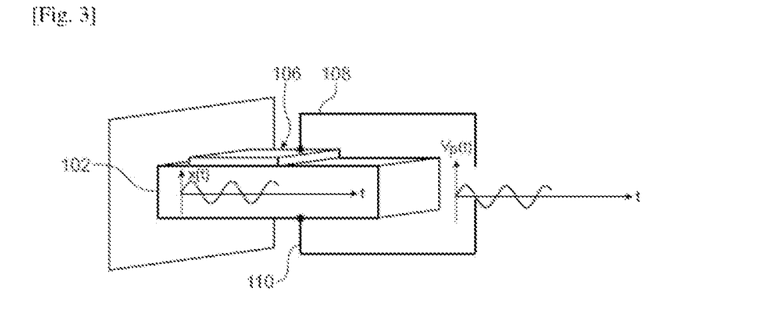
FIG. 3 schematically shows an exemplary embodiment of a mechanical resonator coupled to an element for converting vibratory energy into electrical energy including a portion of piezoelectric material.

FIG. 3 shows an exemplary embodiment of the mechanical resonator 102, here of the beam type, coupled to a conversion element 106 including a portion of piezoelectric material.

In the first embodiment described herein, the electrical generator 104 also comprises an electrical energy storage element 112 including a first electrode 114 electrically coupled to the first output electrode 108 of the conversion element 106. In the example of an embodiment shown in FIG. 2, the electrical energy storage element 112 corresponds to an inductor. The value of this is, for example, between approximately 100 µH and 10 mH. Alternatively, this electrical energy storage element 112 may correspond to a capacitor, for example formed by at least one capacitor.

The electrical generator 104 also includes an AC-to-DC voltage conversion device 116 comprising a first input terminal 118 electrically coupled to the first output electrode 108 of the conversion element 106 and a second input terminal 120 electrically coupled to a second electrode 122 of the electrical energy storage element 112. In the first embodiment described herein, the AC-to-DC voltage conversion device 116 comprises a diode bridge, or Graetz bridge, formed by four diodes. Alternatively, other types of AC-to-DC voltage conversion devices may be used to form the device 116, such as an active voltage rectifier. Such an active voltage rectifier may be, for example, implemented as one of those described in the paper by Martin Nielsen-Lönn et al, "Design of Efficient CMOS Rectifiers for Integrated Piezo-MEMS Energy-Harvesting Power Management Systems," 2015 European Conference on Circuit Theory and Design (ECCTD), Trondheim, Norway, 2015.

The electrical generator 104 also comprises a bi-directional switch 124 configured to couple or not couple the second electrode 122 of the electrical energy storage element 112 to the second output electrode 110 of the conversion element 106 depending on the value of the signal received at a control input 126 of the electrical generator 104. In FIG. 2, the signal received at the control input 126 of the electrical generator 104 is referred to as $v_{SW}$.

Figure 2:
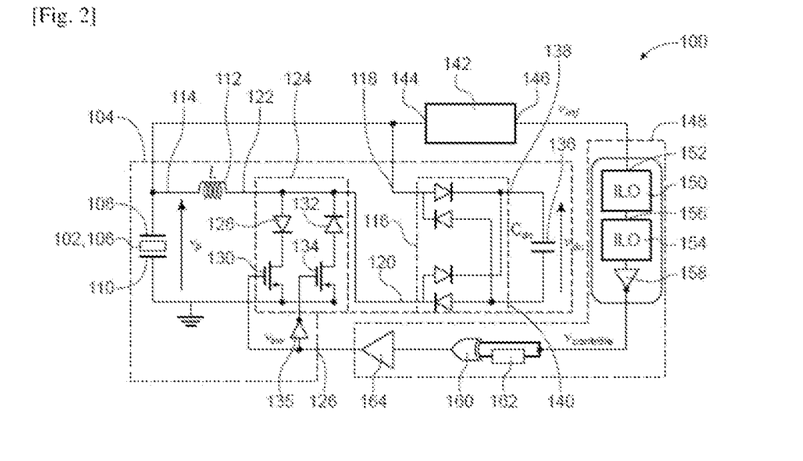
FIG. 2 schematically shows a device for recovering vibratory energy from a mechanical resonator according to a first embodiment.

In the exemplary embodiment shown in FIG. 2, the bi-directional switch 124 comprises a first diode 128 and an NMOS transistor 130 forming, when the NMOS transistor 130 is in the on state, a first conduction path allowing current to flow from the second electrode 122 of the electrical energy storage element 112 to the second output electrode 110 of the conversion element 106. The anode of the first diode 128 is electrically coupled to the second electrode 122 of the electrical energy storage element 112. The cathode of the first diode 128 is electrically coupled to the drain of the NMOS transistor 130. The source of the NMOS transistor 130 is electrically coupled to the second output electrode 110 of the conversion element 106. The gate of NMOS transistor 130 is electrically coupled to the control input 126 of electrical generator 104.

The bi-directional switch 124 also comprises a second diode 132, a PMOS transistor 134, and an inverter 135 forming, when the PMOS transistor 134 is in the on state, a second conduction path allowing current to flow from the second output electrode 110 of the conversion element 106 to the second electrode 122 of the electrical energy storage element 112. The cathode of the second diode 132 is electrically coupled to the second electrode 122 of the electrical energy storage element 112. The anode of the second diode 132 is electrically coupled to the drain of the PMOS transistor 134. The source of the PMOS transistor 134 is electrically coupled to the second output electrode 110 of the conversion element 106. The gate of the PMOS transistor 134 is electrically coupled to the control input 126 of the electrical generator 104 via the inverter 135.

Thus, when the control signal $v_{SW}$ has a high value, or '1', the NMOS 130 and PMOS 134 transistors are in the on state, and current can then flow through one of the first and second conduction paths between the second electrode 122 of the electrical energy storage element 112 and the second output electrode 110 of the conversion element 106, thereby allowing charges to flow from one to the other of the output electrodes 108, 110 of the conversion element 106. When the control signal $v_{SW}$ has a low value, or '0', the NMOS 130 and PMOS 134 transistors are in a blocked state, and current can no longer flow between the second output electrode 110 of the conversion element 106 and the second electrode 122 of the electrical energy storage element 112.

Figure 4:
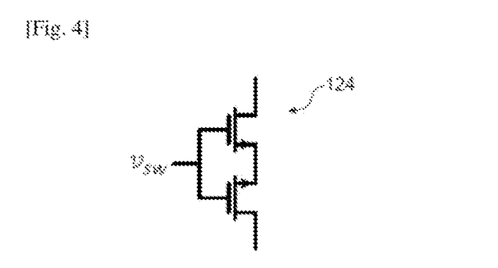
FIG. 4 shows schematically an exemplary embodiment of a bidirectional switch used in a device for recovering vibratory energy from a mechanical resonator.

FIG. 4 shows an alternative embodiment of the bidirectional switch 124. In this embodiment, the bidirectional switch 124 comprises two NMOS transistors (but which could be of the PMOS type according to another embodiment) arranged head-to-tail with respect to each other, i.e., comprising their source coupled to each other and their gate receiving the control signal $v_{SW}$.

The electrical generator 104 also includes an output capacitance 136, formed for example by a capacitor, electrically coupled to output terminals 138, 140 of the AC-to-DC voltage conversion device 116. The output capacitance 136 has a $C_{DC}$ value of, for example, between about 1 µF and 100 µF, and the voltage across it is referred to as $v_{DC}$.

In the first embodiment described herein, the electrical generator 104 has an SSH-series structure (SSHI when the electrical energy storage element 112 is an inductor, and SSHC when the element 112 is a capacitor array). Thus, the electrical generator 104 is configured to periodically transfer, upon control of the signal $v_{SW}$, at least a portion of the electrical charges from one to the other of the first and second output electrodes 108, 110 of the conversion element 106, through switching of the bidirectional switch 124. When the electrical generator 104 has an SSHC structure, the control of the bidirectional switch 124 may be adapted in the same manner as in the following papers: Sijun Du et al, "A Fully Integrated Split-Electrode SSHC Rectifier for Piezoelectric Energy Harvesting," IEEE Journal of Solid-State Circuits, Vol. 54, Issue 6, June 2019, pages 1733-1743; L. Liu et al, "An Efficient Interface Circuit for Miniature Piezoelectric Energy Harvesting with P-SSHC," Journal of Circuits, Systems and Computers, 2019.

The device 100 also comprises a converter 142 including an input 144 electrically coupled to the first output electrode 108 of the conversion element 106. The converter 142 is configured to output a square wave signal $v_{INJ}$ to an output 146 with a frequency equal to the frequency of the conversion signal $v_P$ outputted from the conversion element 106.

In this first embodiment, the converter 142 outputs the square wave signal $v_{INJ}$ with a frequency equal to the frequency of the conversion signal $v_P$ and, of which, the value switches when one of the peak values of $v_P$ is reached. More particularly, the converter 142 is configured such that the square wave signal $v_{INJ}$ outputted has a first value (e.g. '1') when the derivative of the voltage $v_P$ is positive and has a second value (e.g. '0'), different from the first value, when the derivative of the voltage $v_P$ is negative.

Figure 5:
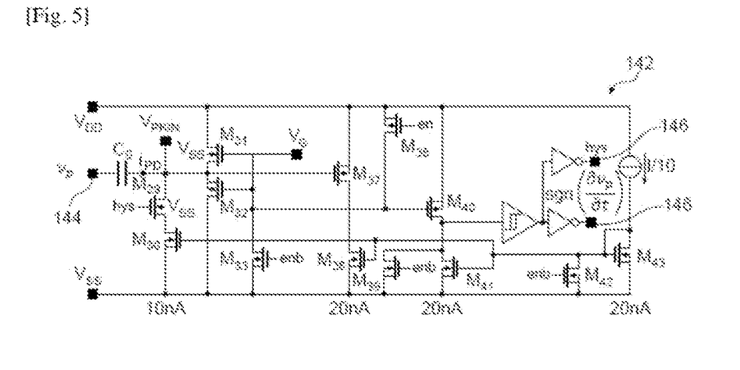
FIG. 5 schematically shows an exemplary embodiment of a converter used in a device for recovering the vibratory energy of a mechanical resonator.

FIG. 5 shows an example of an embodiment of the converter 142.

The converter 142 implements here the "sign of the derivative" function, noted $$\text{sgn}\left(\frac{d(\cdot)}{dt}\right),$$

applied to the voltage across Cp. For this, the voltage $v_P$ is applied to a capacitor $C_0$. The current flowing through this capacitor, named $i_{PD}$, is proportional to $$\frac{d(v_p - V_{PKIN})}{dt},$$

with $v_{PKIN}$ corresponding to a voltage internal to the converter 142 and being maintained relatively constant thanks to a loop formed by transistors named $M_{31}$, $M_{32}$ and $M_{37}$ on FIG. 5. The value of the $i_{PD}$ current is therefore only a function of the term $$\frac{d(v_p)}{dt}.$$

When the $i_{PD}$ current is positive, this current flows through transistor $M_{32}$ and then to ground (noted $V_{SS}$ on FIG. 5). When the voltage derivative $v_P$ becomes negative, the $i_{PD}$ current also becomes negative, and flows through transistor $M_{31}$ instead of $M_{32}$. Thus, when the $i_{PD}$ current changes polarity, it does not go through the same path, which creates a voltage difference on the gate potential $V_G$ of transistors $M_{31}$ and $M_{32}$. This voltage difference is then amplified by transistors $M_{40}$ and $M_{41}$. At the output 146 of the converter 142, a square-wave voltage is obtained, the state of which depends on the polarity of the current $i_{PD}$, and therefore the sign of the voltage derivative $v_P$ is obtained.

The detailed operation of such a converter 142 is given, for example, in the paper by A. Morel et al, "A shock optimized SECE integrated circuit," IEEE J. Solid-State Circuit, vol. 53, no. 12, December 2018, pages 3420-3433.

The device 100 also comprises a device 148 for converting a frequency variation into a phase variation.

This device 148 comprises a first ILO 150, of which the injection input 152 is electrically coupled to the output 146 of the converter 142 and which is configured such that its free oscillation frequency is substantially equal to the resonant frequency of the mechanical resonator 102.

The device 148 further comprises a second ILO 154 of which the injection input 156 is coupled to the output of the first ILO 150. As with the first ILO 150, the second ILO 154 is configured such that its free oscillation frequency is substantially equal to the resonant frequency of the mechanical resonator 102.

In the first embodiment described herein, the ILOs 150 and 154 are relaxation type oscillators. Alternatively, the ILOs 150 and 154 may correspond to harmonic type ILOs.

The device 148 also comprises a 180° phase shifter circuit, referenced 158, with an input coupled to the output of the second ILO 154. In the example embodiment shown in FIG. 2, since the signal outputted from the second ILO 154 is a square wave signal, as the signal received and processed by the device 148 is a square wave signal, the circuit 158 is formed by an inverter.

The device 148 further comprises an EXCLUSIVE OR gate 160, a first input of which is electrically coupled to the output of the circuit 158 and a second input of which is electrically coupled to the output of the circuit 158 via a delay element 162. The output of the EXCLUSIVE OR gate 160 is coupled to an amplifier 164 the output of which is coupled to the control input 126 of the electrical generator 104.

Figure 6:
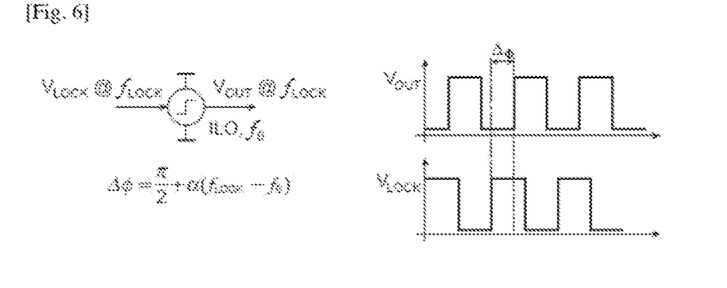
FIG. 6 shows the operating principle of an ILO.

The operating principle of an ILO is recalled below, in connection with FIG. 6.

An ILO is an oscillator characterized by its free-running frequency $f_0$ and to which a locking, or injection signal $V_{LOCK}$ of frequency $f_{LOCK}$ is applied. Since the behavior of the oscillator is to synchronize itself to the injection signal, the frequency of the output signal $V_{OUT}$ outputted by the ILO corresponds to the locking frequency $f_{LOCK}$. The output signal $V_{OUT}$ is phase shifted by $\Delta\phi$ with respect to $v_{LOCK}$.

The value of the phase shift $\Delta\phi$ is a function of the term $(f_{LOCK}-f_0)$ and is expressed by the relation:

$$\Delta\Phi = \frac{\pi}{2} + \alpha(f_{LOCK} - f_0)$$

An ILO therefore establishes a phase shift between the output signal $v_{OUT}$ and the locking signal $V_{LOCK}$ that depends on the frequency of the locking signal $f_{LOCK}$ and its free-running frequency $f_0$. The ILO thus forms a frequency variation/phase variation converter converting the locking frequency $f_{LOCK}$ into a phase shift $\Delta\phi$. In addition, the frequency of the locking signal $f_{LOCK}$ is retained in the output signal $V_{OUT}$.

Figure 7:
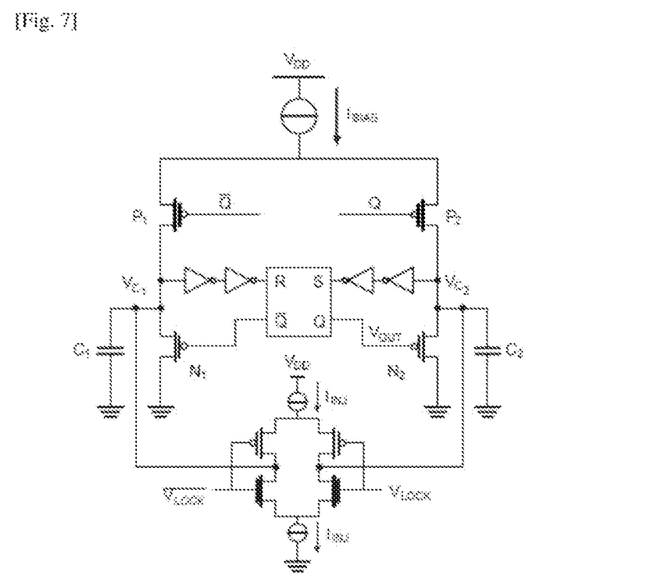
FIG. 7 shows an example of a relaxation ILO.

A schematic diagram of an example embodiment of a relaxation type ILO is shown in FIG. 7.

In FIG. 7, the ILO has an RS flip-flop. In the initial state, it is considered that Q=0 and $\overline{Q}$=1. The transistor $P_2$ (PMOS type) is in the off state and the transistor P1 (also PMOS type) is in the on state, with the bias current $I_{BIAS}$ being directed into the capacitor $C_1$ and charges this capacitor. When the voltage across the capacitor $C_1$ exceeds the $V_{INV}$ switching threshold of the inverters coupled to the R and S inputs of the flip-flop, the R input then goes to the 1 state which implies a new state for the outputs of the RS flip-flop: Q=1 and $\overline{Q}$=0. The transistor $P_2$ then goes to the on state and transistor $P_1$ goes to the off state. The $I_{BIAS}$ bias current is directed to the C2 capacitor and charges this capacitor. When the voltage across capacitor $C_2$ exceeds the $V_{INV}$ switching threshold of the inverters coupled to the R and S inputs of the flip-flop, then the S input goes to the 1 state and the outputs of the RS flip-flop change again: Q=0 and $\overline{Q}$=1.

The repetition of this cycle allows the oscillations of the ILO to start.

The free-running oscillation frequency $f_0$ of the ILO depends on the values of the bias current $I_{BIAS}$, the load capacitances $C_1=C_2=C$, and the switching voltage of the $V_{INV}$ inverters. It is expressed by the relation:

$$f_0 = \frac{I_{BIAS}}{2CV_{inv}}$$

The study of ILO locking is described in detail in the paper by N. Goux et al, "A 500 pW 16 KHz Injection Locked Oscillator for Ultra-Low Power Time-Domain ADC Application," 2018 16th IEEE International New Circuits and Systems Conference, pp. 200-204.

The ILO locking is achieved by injecting an $I_{LOCK}$ current into the load capacitances $C_1$ and $C_2$ via a $v_{LOCK}$ voltage-controlled inverter current injector. This current injection changes the average value $I_{BIAS}$ of the bias current, producing the oscillator locking on the $f_{LOCK}$ frequency.

In this ILO, the phase shift $\Delta\phi$ is expressed by the following equation:

$$\Delta\Phi = \frac{\pi}{2} + \frac{\pi C V_{INV}}{I_{LOCK}}(f_{LOCK} - f_0)$$

This phase shift is linear and proportional to the locking frequency of the system. As for the gain of the system, it is fixed by the slope of the line represented by this equation. It is written:

$$\alpha = \frac{\pi C V_{INV}}{I_{LOCK}}$$

This gain is therefore adjustable by the parameters C, $V_{INV}$ and $I_{LOCK}$.

The locking range $\Delta f$ of the ILO is defined by the equation:

$$\frac{\Delta f}{f_0} = \frac{2 I_{LOCK}}{I_{BIAS}}$$

Thus, the value of $\Delta f$ depends on the ratio of the $I_{BIAS}$ and $I_{LOCK}$ bias and synchronization currents.

Figure 8:
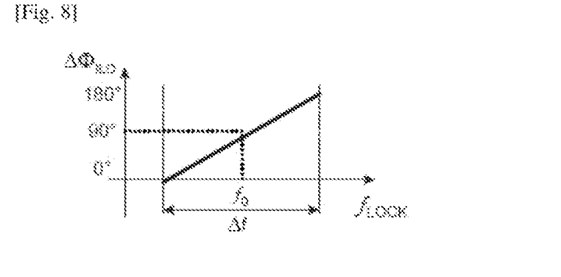
FIG. 8 shows the phase shift characteristic of an ILO.

The phase shift characteristic of ILO is shown in FIG. 8. This characteristic corresponds to an increasing and linear curve over the ILO's locking range $\Delta f$. The value of this phase shift is 90° at frequency $f_0$.

In the device 148, the two ILOs 150 and 154 are mounted in quadrature. Such a setup consists of locking the two ILOs 150, 154 in series to their free-running oscillation frequency $f_0$, or natural frequency, so as to obtain output signals in quadrature, i.e., 90° out of phase relative to each other.

In the device 148, it is hoped to obtain a zero-phase shift between the $v_{INJ}$ signal applied at the input of device 148 and the $v_{SW}$ signal obtained at the output of device 148 when the ILOs 150 and 154 are locked to an equal frequency $f_0$, i.e., when the frequency of the $v_{INJ}$ signal (which is equal to the vibration frequency $f_{VIB}$ of the resonator 102) is equal to $f_0$. This is the reason why the inverter 158 is present at the output of the ILO 154, thus adding a 180° phase shift to the phase shift of the ILOs 150, 154 (which corresponds to 90°+90°).

The phase of the output signal $V_{SW}$ is thus equal to that of the signal $V_{INJ}$ modulo 360°, which allows to have at the output of the device 148 a control signal $V_{SW}$ in phase with the signal $V_{INJ}$ when the mechanical resonator 102 vibrates at its open circuit resonance frequency, and which is phase shifted proportionally to the frequency difference $f_{VIB}$-resonance frequency of the mechanical resonator 102 when $f_{VIB}$ is different from $f_0$.

More generally, the phase shift between the signal $v_{SW}$ obtained at the output of the device 148 and the signal $v_{INJ}$ applied at the input of device 148 is expressed by the following equation:

$$\phi = 2\pi + 2\frac{\pi C V_{INV}}{I_{LOCK}}(f_{vib} - f_0)$$

Figure 9:
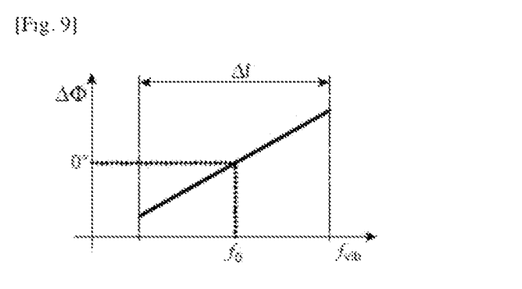
FIG. 9 shows the phase shift characteristic of the frequency variation to the phase variation conversion device used in the vibration energy recovery device of a mechanical resonator.

The phase shift characteristic of the device 148 is shown in FIG. 9. In this characteristic, the phase of the output signal is proportional to the frequency of the locking signal. The slope 's' of this characteristic is expressed by the equation:

$$s = \frac{2 C V_{INV}}{I_{BIAS}}$$

The device 148 has therefore:
a free-running oscillation frequency $f_0$ adjustable by adjusting the value of the bias current $I_{BIAS}$ $$\left(\text{because } f_0 = \frac{I_{BIAS}}{2 C V_{INV}}\right).$$

a locking range adjustable by adjusting the value of the injection current $I_{INJ}$ $$\left(\text{because } \frac{\Delta f}{f_0} = \frac{2 I_{INJ}}{I_{BIAS}}\right).$$

an adjustable slope by adjusting the value of the injection current $I_{INJ}$ $$\left(\text{because } s = \frac{2 C V_{INV}}{I_{BIAS}}\right).$$

In order to obtain the desired operation, the ILOs 150 and 154 are calibrated (during operation of the device 100 or during a pre-calibration phase before operation of the device 100) so that the free-running oscillation frequency $f_0$ of the ILOs 150, 154 is equal to the open circuit resonance frequency of the mechanical resonator 102. This adjustment can be accomplished by adjusting the value of $I_{BIAS}$.

The ILOs 150, 154 are also calibrated such that the slope of the $\phi(f_{vib}-f_0)$ characteristic (shown in FIG. 9) is equal to or similar to the $\phi_{opt}(f_{vib})$ characteristic (shown in FIG. 1). This adjustment can be accomplished by adjusting the value of $I_{LOCK}$.

The device 148 allows the phase of the control signal $v_{SW}$ to be set in accordance with the evolution of the phase shift between the vibration frequency $f_{VIB}$ and the resonant frequency of the resonator 102.

The device 148 thus allows in particular:
to maintain the frequency of the injection signal $v_{INJ}$ in the outputted control signal $v_{SW}$.
to output the control signal $v_{SW}$ with a variable phase depending on its frequency (which corresponds to the mechanical vibration frequency $f_{VIB}$).
to have a zero-phase shift at the open circuit resonance frequency of the resonator 102.
to have an adjustable locking range depending on the parameters of the piezoelectric material.

The overall operation of the device 100 shown in FIG. 2 is described below.

Initially, the conversion element 106 operates in open circuit. For this purpose, the bidirectional switch 124 is placed in the open position (transistors 130 and 134 set to the off state). Thus, no current flows through the electrical energy storage element 112 or the device 116. Considering negligible dielectric losses, the voltage $v_P$ at the terminals of the conversion element 106, which is for example of the order of 5 to 30 volts in amplitude, can be expressed as a function of the mechanical displacement x such that:

$$v_p(t) - v_p(t_0) = \frac{\alpha}{c_p}(x(t) - x(t_0)) \quad (1)$$

with $\alpha$ representing the force factor (which is the ratio of the force generated by the piezoelectric material on the mechanical resonator to the voltage at the terminals of the piezoelectric material) of the piezoelectric material of element 106, and $C_P$ the intrinsic capacitance of the piezoelectric material (for example, between about 100 pF and 100 nF). By choosing $t_0=0$ as the last instant at which energy was recovered, the conditions $v_P(t_0)=v_0$ and $x(t_0)=x_0$ are thus obtained.

The converter 142 forms a block switching the value of the output signal $v_{INJ}$ when the peak value of the voltage $v_P$ is reached. When the derivative of the voltage $v_P$ is positive, the value of $v_{INJ}$ is '1', and when the derivative of the voltage $v_P$ is negative, the value of $v_{INJ}$ is '0'. Thus, its operation can be summarized by the equation:

$$v_{INJ} = \text{sgn}\left(\frac{dv_p}{dt}\right)$$

with sgn the sign function defined as:

$$\forall u \in \mathbb{R}, \text{sgn}(u) = V_{DD}\left(\frac{1}{2} + \frac{|u|}{2u}\right)$$

with $V_{DD}$ corresponding to the supply voltage of the converter 142.

Considering the previous equations, we obtain:

$$v_{INJ} = \text{sgn}\left(\frac{\alpha}{C_p}\frac{dx}{dt}\right) = \text{sgn}\left(\frac{dx}{dt}\right)$$

Thus, the output voltage $v_{INJ}$ of the converter 142 comprises the information of the phase and frequency of the mechanical deformation of the mechanical resonator 102.

This signal is sent to the input of device 148. The signal $v_{control}$ obtained at the output of the inverter 158 is a square wave signal of frequency equal to the frequency $f_{VIB}$ of the mechanical vibration of the resonator 102, and phase shifted by $\Delta\varnothing$ with respect to the signal $v_{INJ}$.

The signal $v_{control}$ passes through the EXCLUSIVE OR gate 160, of which one of the input branches comprises the delay element 162, to generate the signal $v_{SW}$, which changes high state on each edge of $v_{control}$ and remains high for a programmable time corresponding to the duration of the delay applied by the element 162. The optimal value of this delay depends primarily on the value of the inductance L forming the electrical energy storage element 112, the capacitance $C_P$ of the piezoelectric material of the conversion element 106, and the piezoelectric generator. This programmable time can also be dynamically adjusted with, for example, a gradient algorithm, which complicates the control loop but allows for finer adjustment of the dynamics of the piezoelectric generator. A gradient algorithm is for example described in the paper by A. Morel et al, "Self-Tunable Phase-Shifted SECE Piezoelectric Energy-Harvesting IC with a 30 nW MPPT Achieving 446% Energy-Bandwidth Improvement and 94% Efficiency," 2020 IEEE International Solid-State Circuits Conference—(ISSCC).

When $v_{SW}$ is in the high state, the electrical energy storage element 112 is then connected to both output electrodes 108, 110 of the conversion element 106. Energy begins to be transferred from the conversion element 106 to the electrical energy storage element 112. The voltage $v_P$ decreases rapidly, and the current in the element 112 increases. When $v_{SW}$ falls back to the low state, then all of the current remaining in the element 112 is then redirected to the output capacitance 136 at the output of the converter 116.

Thus, within the device 100, the converter 142 and the device 148 form a control loop that adjusts the phase of charge reversal at the terminals of the conversion element 106 as a function of the difference between the mechanical vibration frequency ($f_{vib}=f_{inj}$) and the resonant frequency of the mechanical resonator 102.

In this device 100, the information of the mechanical excitation frequency of the resonator 102 as well as the mechanical displacement phase of the resonator 102 is retrieved from the voltage $v_P$ through the converter 142 and is then transmitted to the device 148 which forms a frequency/phase converter. The signal obtained at the output of the device 148 is then used to control the bidirectional switch 124 allowing energy extraction by the device 100.

The adjustment of $\Delta\varphi$ allows, thanks to the indirect piezoelectric effect, to adjust the resonance frequency of the mechanical resonator 102, and to slave it to the vibration frequency $f_{VIB}$ in order to maximize the power transfer.

The indirect piezoelectric effect reflects the (piezoelectric) conversion of the voltage at the terminals of the piezoelectric material into a force applied to the mechanical resonator. By reversing the charges, the temporal shape of the piezoelectric voltage (and thus the shape of the force applied to the resonator) is changed, and thus the dynamics of the system (and thus its resonant frequency) is modified. In addition, adjusting the charge reversal moment adjusts the resonant frequency of the system through this effect.

Figure 10:
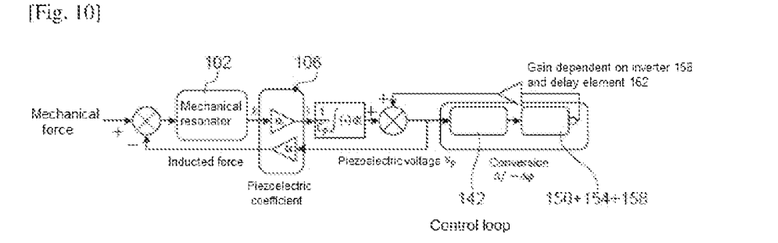
FIG. 10 shows a block diagram modeling, in a simplified way, the influence of the control loop realized in the vibration energy recovery device.

FIG. 10 shows a block diagram modeling, in a simplified manner, the influence of the control loop realized in the device 100 on the voltage $v_P$, and thus on the resonant frequency of the mechanical resonator 102.

Figure 11:
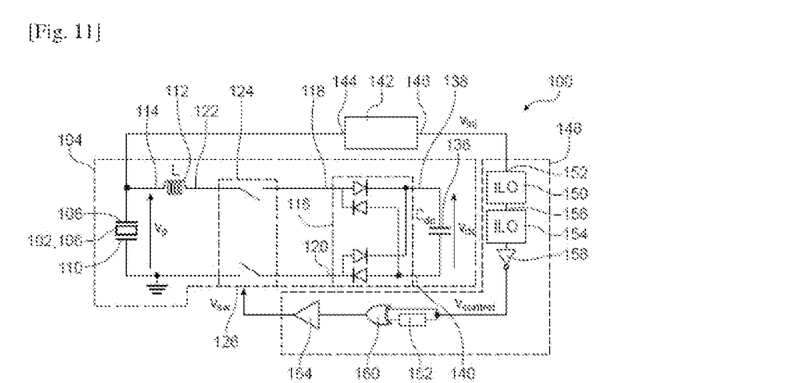
FIG. 11 schematically shows a device for recovering vibratory energy from a mechanical resonator according to a variant of the first embodiment.

The device 100 for recovering vibratory energy from the mechanical resonator 102 according to a variant of the first embodiment is described below in connection with FIG. 11.

Unlike the configuration previously described in connection with FIG. 2 in which the bidirectional switch 124 is configured to couple or not couple the second electrode 122 of the electrical energy storage element 112 to the second output electrode 110 of the conversion element 106 depending on the value of the signal received at the control input 126 of the electrical generator 104, the bi-directional switch 124 is here configured to couple or not couple the second electrode 122 of the electrical energy storage element 112 to the first input terminal 118 of the AC-DC voltage conversion device 116, and couple or not couple the second output electrode 110 of the conversion element 106 to the second input terminal 120 of the AC-DC voltage conversion device 106, depending on the value of the signal received at the control input of the electrical generator.

In this variant, since the charge reversal is through the output capacitance 136, a portion of the energy remains in the output capacitance 136 during the reversal.

Other variants of the first embodiment are possible, in particular, arranging the bidirectional switch 124 and the electrical energy storage element 112 differently within the device 100.

The device 100 for recovering vibratory energy from the mechanical resonator 102 according to a second embodiment is described below in connection with FIG. 12.

As in the first embodiment, the device 100 comprises the mechanical resonator 102, the electrical generator 104, the converter 142, and the frequency variation to phase variation conversion device 148.

However, unlike the first embodiment, the AC-to-DC voltage conversion device 116 of the electrical generator 104 comprises, in this second embodiment, its first and second input terminals 118, 120 coupled to the first and second output electrodes 108, 110 of the conversion element 106, respectively.

The electrical generator 104 further comprises a Buck converter 166 including first and second input terminals 168, 170 coupled to first and second output terminals 138, 140, respectively, of the AC-to-DC voltage conversion device 116. The Buck converter 166 comprises two output terminals 172, 174 coupled to the output capacitor 136.

The frequency variation to phase variation conversion device 148 in this second embodiment is also different from that of the device 100 according to the first embodiment.

The device 148 includes a D flip-flop 176 comprising a clock input coupled to the output of the 180° phase shifter circuit 158, a data input to which a non-zero value electrical potential ($V_{DD}$ in FIG. 12) is applied, a reset input, and an output coupled to the control input of a Buck converter switch 166 which corresponds to the control input 126 of the electrical generator 104.

The device 148 also includes a voltage comparator 178 having two input terminals to which a voltage (referred to as $v_{rec}$ in FIG. 12) outputted to the first and second output terminals 138, 140 of the AC to DC voltage conversion device 116 is applied, and an output coupled to the reset input of the D flip-flop 176.

Figure 12:
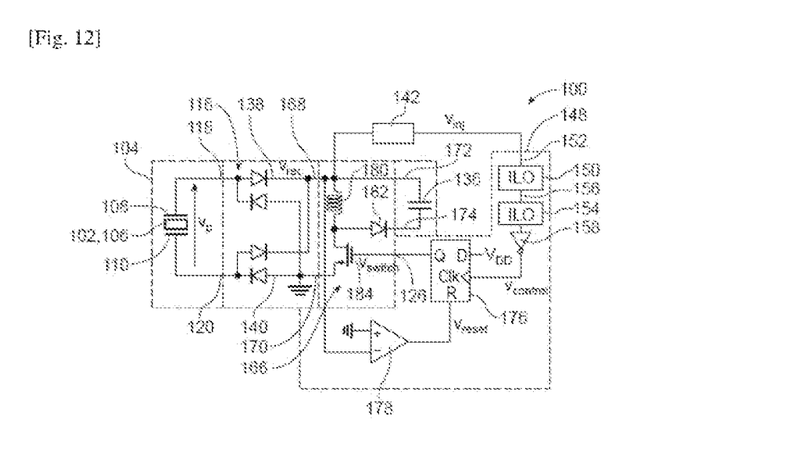
FIG. 12 schematically shows a device for recovering vibratory energy from a mechanical resonator according to a second embodiment.

In the exemplary embodiment shown in FIG. 12, the Buck converter 166 comprises an inductor 180, a diode 182 and a MOS transistor 184 forming the switch to which the output of the D flip-flop 176 is coupled.

In this second embodiment, the flip-flop D 176 drives the off or on state of the MOS transistor 184, the state of the flip-flop D 176 being reset from its reset input when the voltage $v_{rec}$ outputted by the device 116 is zero.

As an alternative to the second embodiment described above, the Buck converter 166 may be replaced with a Buck-Boost or Boost structure.

Alternatively, the inductance 180 of the Buck converter 166 may also be replaced by a transformer, such as a Flyback type converter.

Figure 13:
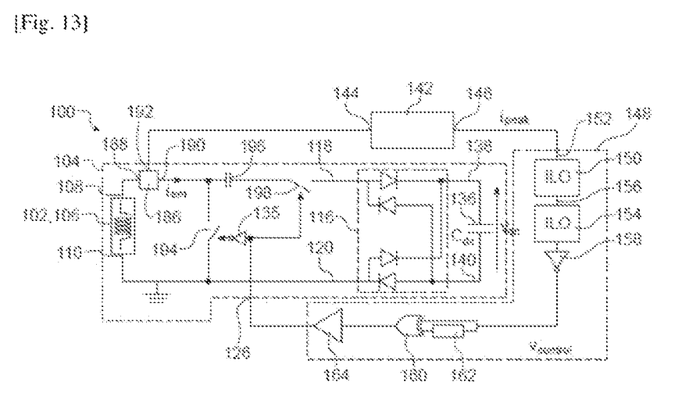
FIG. 13 schematically shows a device for recovering vibratory energy from a mechanical resonator according to a third embodiment.

The device 100 for recovering vibratory energy from the mechanical resonator 102 according to a third embodiment is described below in connection with FIG. 13.

In this third embodiment, the element 106 for converting mechanical vibration energy of the mechanical resonator 102 into electrical charges comprises one or more coils coupled to a magnetic element. The conversion signal outputted by the conversion element 106 and the frequency of which is equal to the vibration frequency of the mechanical resonator 102 corresponds to a sinusoidal current obtained on the first output electrode 108 of the conversion element 106. In FIG. 13, this current is referred to as $i_{em}$.

In this third embodiment, the device 100 comprises an element 186 for transcribing the value of the current $i_{em}$ obtained at the first output electrode 108 of the conversion element 106 into a voltage that can be used by the converter 142. Such an element 186 corresponds, for example, to a resistor coupled to an amplifier. The element 186 comprises an input 188 coupled to the first output electrode 108 of the conversion element 106 and into which the current $i_{em}$ outputted by the conversion element 106 is fed. The current $i_{em}$ flows through element 186 and out by a first output 190. The element 186 also includes a second output 192 to which the voltage transcribing the value of the current $i_{em}$ is outputted and which is coupled to the input of the converter 142.

In this third embodiment, the device 100 also comprises a first switch 194 ensuring the coupling or not between the first output 190 of the element 186 and the second output electrode 110 of the conversion element 106, according to its open or closed state. Because the element 186 does not change the current outputted by the conversion element 106, the current outputted on the first output 190 of the element 186 is equal to the current outputted on the first output electrode 108 of the conversion element 106. The first switch 194 can be viewed as either coupling or not coupling the output electrodes 108, 110 to each other depending on its open or closed state.

The device 100 according to the third embodiment also comprises a resonant capacitor 196 comprising a first terminal coupled to the first switch 194 and the first output 190 of the element 186, and a second terminal coupled to a second switch 198 providing coupling or non-coupling between the second terminal of the resonant capacitor 196 and the first input terminal 118 of the device 116, depending on its open or closed state.

The electrical generator 104 also comprises the inverter 135 allowing the inverting of the control signal received at the control input 126 of the generator 104. The first switch 194 is controlled by the signal outputted from the inverter 135 and the second switch 198 is controlled by the control signal received at the control input 126. Thus, the first and second switches 194, 198 are configured to alternately couple the first output electrode 108 of the conversion element 106 to the second output electrode 110 of the conversion element 106 or to a first input terminal 118 of the AC-to-DC voltage conversion device 116 through the resonant capacitor 196. The second input terminal 118 of the conversion device 116 is electrically coupled to the second output electrode 110 of the conversion element 106.

In the device 100 according to the third embodiment, the first switch 194 is closed the majority of the time. The current flowing through the first switch 194, which corresponds to the short circuit current of the electromagnetic generator, increases as the vibration moves the magnetic element of the conversion element 106 relative to all of the turns of the coil or coils of the conversion element 106. When the current reaches an extremum, i.e., is out of phase by a certain angle the value of which is determined by the ILOs 150, 154, the first switch 194 opens and the second switch 198 closes. The coil or coils of the conversion element 106 then enter into resonance with the capacitance 196, and the current begins to oscillate at a high frequency, for example between 10 kHz and 100 kHz. The frequency of this oscillation is higher than the frequency of vibration of the resonant element 102, which is, for example, between 10 Hz and 200 Hz. The second switch 198 is held closed for a half resonant period of the LC circuit formed by the coil(s) of the conversion element 106 and the resonant capacitance 196, i.e., $$\frac{T_{res}}{2} = \pi\sqrt{L_{em}C_{inv}},$$

where $T_{res}$ is the resonant period, $L_{em}$ is the value of the inductance formed by the coil(s) of the conversion element 106, and $C_{inv}$ is the value of the resonant capacitance 196. Closing the second switch 198 reverses the polarity of the current outputted by the conversion element 106. Some energy $(E=\int_0^{T_{res}/2} i_{em} v_{dc} dt)$ is retained in the output capacitance 136 during the reversal of the current in the coil. The current therefore flows into the output capacitance 136 of the circuit for a time equal to the delay set by element 162.

The current outputted by the conversion element 106 is then sent into the output capacitance 136 for a duration equal to the delay applied by the element 162. During this time, the coil(s) of the conversion element 106 and the output capacitance 136 form an oscillating parallel LC circuit.

In the previously described embodiments, the ILOs 150 and 154 correspond to relaxation ILOs. Other ILO-based architectures may be used, such as harmonic ILOs. In addition, the device 100 may have a pre-calibration circuit for the ILO(s) of the device 100 adjusting, prior to use of the device 100, the free oscillation frequency and/or the locking range of the ILO(s) of the device 100.

As an alternative to the previously described embodiments, it is possible that the AC to DC voltage conversion device 116 of the electrical generator 104 comprises elements different from the previously described diode bridge, corresponding for example to an active full-wave rectifier.

As an alternative to the previously described embodiments, the element 106 for converting mechanical vibratory energy of the mechanical resonator 102 into electrical charges may comprise one or more coils coupled to a magnetic element.

As an alternative to the previously described embodiments, a filter may be interposed between the output 146 of the converter 142 and the injection input 152 of the first ILO 150, depending on the desired signal on the injection input 152 of the first ILO 150.

In the previously described embodiments and examples, the device 100 is used as a vibration energy recovery device. Alternatively, the device 100 may be used as a vibration energy damping device. In this case, the device 100 may not comprise the conversion device 116 and the output capacitor 136.

CITED REFERENCES

1) U.S. Pat. No. 8,773,004 B2
2) E. Lefeuvre et al, "A comparison between several vibration-powered piezoelectric generators for standalone systems" Sensors and Actuators A: physical, 126405-16, 2006.
3) E. Lefeuvre et al, "Power and frequency bandwidth improvement of piezoelectric energy harvesting devices using phase-shifted synchronous electric charge extraction interface circuit," Journal of Intelligent Material Systems and Structures, 2017.
4) Y. Cai et al, "A piezoelectric energy-harvesting interface circuit with fully autonomous conjugate impedance matching, 156% extended bandwidth, and 0.38 uW power consumption," IEEE International Solid-State Circuit Conference (ISSCC) 2018.
5) Martin Nielsen-Lönn et al, "Design of Efficient CMOS Rectifiers for Integrated Piezo-MEMS Energy-Harvesting Power Management Systems," 2015 European Conference on Circuit Theory and Design (ECCTD), Trondheim, Norway, 2015.
6) Sijun Du et al, "A Fully Integrated Split-Electrode SSHC Rectifier for Piezoelectric Energy Harvesting," IEEE Journal of Solid-State Circuits, vol. 54, Issue 6, June 2019, pages 1733-1743.
7) L. Liu et al, "An Efficient Interface Circuit for Miniature Piezoelectric Energy Harvesting with P-SSHC," Journal of Circuits, Systems and Computers, 2019.
8) A. Morel et al, "A shock optimized SECE integrated circuit," IEEE J. Solid-State Circuit, vol. 53, no. 12, December 2018, pages 3420-3433.
9) N. Goux et al, "A 500 pW 16 KHz Injection Locked Oscillator for Ultra-Low Power Time-Domain ADC Application," 2018 16th IEEE International New Circuits and Systems Conference, pp. 200-204.
10) A. Morel et al, "Self-Tunable Phase-Shifted SECE Piezoelectric Energy-Harvesting IC with a 30 nW MPPT Achieving 446% Energy-Bandwidth Improvement and 94% Efficiency," 2020 IEEE International Solid-State Circuits Conference—(ISSCC).

The invention claimed is:

1. A device for recovering or dampening vibratory energy from a mechanical resonator, comprising:
an electrical generator comprising at least one conversion element for converting mechanical vibration energy of the mechanical resonator into electrical charges mechanically coupled to the mechanical resonator and configured to output a conversion signal, corresponding either to a sinusoidal voltage obtained between first and second output electrodes of the at least one conversion element or to a sinusoidal current obtained on the first output electrode of the at least one conversion element, of frequency equal to a vibration frequency of the mechanical resonator, the electrical generator being configured to periodically transfer, on command of a signal to be received on a control input, at least part of the electrical charges from one to the other of the first and second output electrodes of the at least one conversion element;
a converter comprising an input electrically coupled to the first output electrode of the at least one conversion element and configured to provide at an output a square wave signal of frequency equal to the frequency of the conversion signal; and
a device for converting frequency variation into phase variation, comprising at least a first injection-locked oscillator, an injection input of which is electrically coupled to the output of the converter and configured such that its free oscillation frequency is substantially equal to a resonance frequency of the mechanical resonator, and configured to output on an output electrically coupled to the control input of the electrical generator, a periodic control signal of frequency equal to the frequency of the conversion signal and whose phase shift, relative to the conversion signal, is a function of a difference between the frequency of the conversion signal and the resonance frequency of the mechanical resonator.

2. The device according to claim 1, wherein the converter is configured such that the outputted square wave signal has a first value when the derivative of the conversion signal is positive and has a second value, different from the first value, when the derivative of the conversion signal is negative.

3. The device according to claim 1, wherein the device for converting frequency variation into phase variation further comprises:
 a second injection-locked oscillator, an injection input of which is coupled to the output of the first injection-locked oscillator and configured such that its free-running oscillation frequency is substantially equal to the resonance frequency of the mechanical resonator; and
 a 180° phase shifter circuit, an input of which is coupled to an output of the second injection-locked oscillator.

4. The device according to claim 3, wherein the device for converting frequency variation into phase variation further comprises an EXCLUSIVE OR gate, a first input of which is electrically coupled to an output of the 180° phase shifter circuit, a second input of which is electrically coupled to the output of the 180° phase shifter circuit via an intermediary delay element and delivering the periodic control signal.

5. The device according to claim 4, wherein an output of the EXCLUSIVE OR gate is coupled to the control input of the electrical generator via an amplifier.

6. The device according to claim 1, wherein the electrical generator further comprises:
 an electrical energy storage element comprising a first electrode electrically coupled to the first output electrode of the conversion element;
 an AC-to-DC voltage conversion device comprising a first input terminal electrically coupled to the first output electrode of the conversion element and a second input terminal electrically coupled to a second electrode of the electrical energy storage element; and
 a bi-directional switch configured to couple or not couple the second electrode of the electrical energy storage element to the second output electrode of the conversion element as a function of a value of the signal received at the control input of the electrical generator.

7. The device according to claim 1, wherein the electrical generator comprises:
 an electrical energy storage element comprising a first electrode electrically coupled to the first output electrode of the conversion element;
 an AC-to-DC voltage conversion device; and
 a bi-directional switch configured to couple or not couple a second electrode of the electrical energy storage element to a first input terminal of the AC-to-DC voltage conversion device, and couple or not couple the second output electrode of the at least one conversion element to a second input terminal of the AC-to-DC voltage conversion device, as a function of a value of the signal received at the control input of the electrical generator.

8. The device according to claim 6, wherein the electrical energy storage element comprises at least one inductance or at least one capacitance.

9. The device according to claim 7, wherein the electrical energy storage element comprises at least one inductance or at least one capacitance.

10. The device according to claim 1, wherein the electrical generator comprises:
 an AC-to-DC voltage conversion device; and
 first and second switches configured to alternately couple the first output electrode of the conversion element to the second output electrode of the conversion element or to a first input terminal of the AC-to-DC voltage conversion device through a resonant capacitance;
 wherein a second input terminal of the AC-to-DC voltage conversion device is electrically coupled to a second output electrode of the conversion element.

11. The device according to claim 6, wherein the AC-to-DC voltage conversion device comprises a diode bridge.

12. The device according to claim 7, wherein the AC-to-DC voltage conversion device comprises a diode bridge.

13. The device according to claim 10, wherein the AC-to-DC voltage conversion device comprises a diode bridge.

14. The device according to claim 6, wherein the electrical generator further comprises an output capacitance electrically coupled to output terminals of the AC-to-DC voltage conversion device.

15. The device according to claim 7, wherein the electrical generator further comprises an output capacitance electrically coupled to output terminals of the AC-to-DC voltage conversion device.

16. The device according to claim 10, wherein the electrical generator further comprises an output capacitance electrically coupled to output terminals of the AC-to-DC voltage conversion device.

17. The device according to claim 1, wherein the electrical generator comprises:
 an AC-to-DC voltage conversion device comprising first and second input terminals coupled to the first and second output electrodes of the at least one conversion element, respectively; and
 a Buck converter comprising first and second input terminals respectively coupled to first and second output terminals of the AC-to-DC voltage conversion device.

18. The device according to claim 17, wherein the device for converting frequency variation into phase variation further comprises:
 a second injection-locked oscillator, of which an injection input is coupled to the output of the first injection-locked oscillator, configured such that its free-running oscillation frequency is substantially equal to the resonance frequency of the mechanical resonator;
 a 180° phase shifter circuit, one input of which is coupled to the output of the second injection-locked oscillator;
 a D flip-flop comprising a clock input coupled to an output of the 180° phase shifter circuit, a data input to which a non-zero electric potential is applied, a reset input, and an output coupled to a control input of a Buck converter switch; and
 a voltage comparator having two input terminals to which a voltage supplied to the first and second output terminals of the AC-to-DC voltage conversion device is applied, and an output coupled to the reset input of the D flip-flop.

19. The device according to claim 1, wherein the conversion element comprises at least one portion of piezoelectric material or at least one coil coupled to a magnetic element.

* * * * *